(12) United States Patent
Ishizawa et al.

(10) Patent No.: US 8,368,582 B2
(45) Date of Patent: Feb. 5, 2013

(54) DOPPLER RADAR APPARATUS AND METHOD OF CALCULATING DOPPLER VELOCITY

(75) Inventors: Hiroshi Ishizawa, Kawasaki (JP);
Masakazu Wada, Kawasaki (JP);
Fumihiko Mizutani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 180 days.

(21) Appl. No.: 12/821,614

(22) Filed: Jun. 23, 2010

(65) Prior Publication Data

US 2011/0050486 A1 Mar. 3, 2011

(30) Foreign Application Priority Data

Aug. 31, 2009 (JP) ................. 2009-200861

(51) Int. Cl.
*G01S 13/00* (2006.01)
*G01S 13/08* (2006.01)
(52) U.S. Cl. .............. 342/26 R; 342/26 A; 342/26 B; 342/26 C; 342/26 D; 342/89; 342/104; 342/159; 342/194
(58) Field of Classification Search .......... 342/26 R, 342/26 A, 26 B, 26 C, 26 D, 89, 104, 115, 342/159, 194
See application file for complete search history.

(56) References Cited

U.S. PATENT DOCUMENTS 3,372,389 A * 3/1968 Bellman et al. ............ 342/89
3,950,750 A * 4/1976 Churchill et al. .......... 342/174
4,528,565 A * 7/1985 Hauptmann ............... 342/91
(Continued)

FOREIGN PATENT DOCUMENTS

JP 11-101870 4/1999
JP 2002-156444 5/2002
(Continued)

OTHER PUBLICATIONS

Extended European Search Report issued Mar. 22, 2012, in European Patent Application No. 10167323.4.

(Continued)

*Primary Examiner* — Jack W Keith
*Assistant Examiner* — Peter Bythrow
(74) *Attorney, Agent, or Firm* — Oblon, Spivak, McClelland, Maier & Neustadt, L.L.P.

(57) ABSTRACT

According to one embodiment, a Doppler radar apparatus includes a quadrature detection unit configured to quadrature-detect a received signal of a reflected pulse from an observation target, and generate time-series data including an in-phase component and a quadrature component, an interference judgment unit configured to judge whether an interference signal is mixed into the received signal based on the time-series data, a correction unit configured to correct a vector expressed by the in-phase component and the quadrature component such that variation with respect to time of a deviation angle of the vector continues when the interference judgment unit has judged that an interference signal is mixed into the received signal, and a calculation unit configured to calculate a Doppler velocity of the observation target based on an amount of variation with respect to time of the deviation angle of corrected vector.

10 Claims, 3 Drawing Sheets

U.S. PATENT DOCUMENTS

| | | | | |
|---|---|---|---|---|
| 4,710,772 | A | * | 12/1987 | Cantwell et al. .............. 342/92 |
| 4,717,916 | A | * | 1/1988 | Adams et al. ................ 342/107 |
| 4,812,849 | A | * | 3/1989 | Otto ........................... 342/194 |
| 5,357,256 | A | * | 10/1994 | Peperone .................... 342/160 |
| 5,422,646 | A | * | 6/1995 | Lewis ......................... 342/160 |
| 6,456,227 | B2 | | 9/2002 | Wada et al. |
| 7,589,666 | B2 | * | 9/2009 | Passarelli et al. ........... 342/196 |
| 2005/0203730 | A1 | | 9/2005 | Aoki et al. |
| 2008/0001808 | A1 | * | 1/2008 | Passarelli et al. .......... 342/26 R |
| 2009/0141775 | A1 | * | 6/2009 | Kober et al. ................ 375/148 |

FOREIGN PATENT DOCUMENTS

| WO | WO 98/33073 A1 | 7/1998 |
|---|---|---|

OTHER PUBLICATIONS

U.S. Appl. No. 12/700,209, filed Feb. 4, 2010, Fumihiko Mizutani, et al.

U.S. Appl. No. 12/700,228, filed Feb. 4, 2010, Fumihiko Mizutani, et al.

"Doppler Radar for Airport Weather Manufacturing Specification (Kagoshima Airport)," p. 19, published May 2006, Japan Meteorological Agency, Kire Jun. 2001, Kikan No. 20, 32 pages.

Office Action mailed Nov. 13, 2012, in Japanese Patent Application No. 2009-200861 filed Aug. 31, 2009 (with English Translation).

* cited by examiner

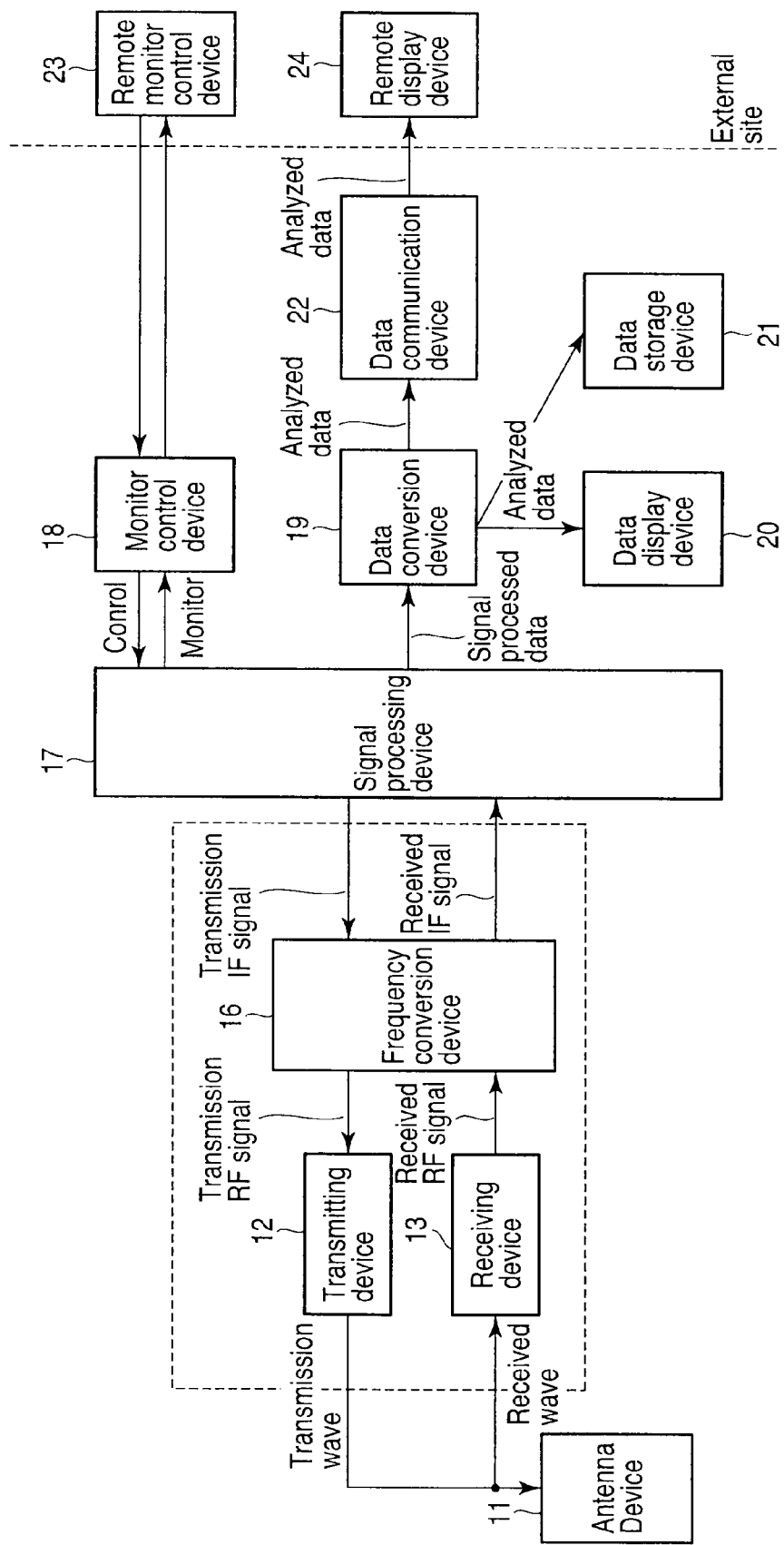
F I G. 1

DOPPLER RADAR APPARATUS AND METHOD OF CALCULATING DOPPLER VELOCITY

CROSS-REFERENCE TO RELATED APPLICATIONS

This application is based upon and claims the benefit of priority from Japanese Patent Application No. 2009-200861, filed Aug. 31, 2009; the entire contents of which are incorporated herein by reference.

FIELD

Embodiments described herein relate generally to a Doppler radar apparatus and a method of calculating Doppler velocity.

BACKGROUND

Weather radars are used to detect the intensity of echoes reflected from precipitation particles of clouds, rain and the like, and to observe or forecast the state of weather. Recently, Doppler radars capable of detecting dynamic change of rain and clouds using the Doppler effect of reflected waves, have been used as weather radars.

When an observation target is close to a radar, the reception frequency becomes high because of the Doppler effect, and when an observation target is away from the radar, on the other hand, the reception frequency becomes low. Using the Doppler effect, Doppler radars detect the moving speed of an observation target based on frequency variation of received waves. More specifically, Doppler radars receive reflected pulses reflected by an observation target, and detect the Doppler velocity based on the amount of phase variation between the pulse hits.

In the case of observation using Doppler radars, signals from other radar sites, for example, may be mixed to the received signals as interference waves. It is also possible that multipath interference occurs and unnecessary signals are mixed to the received signals. As a technique of removing such interference waves, "Meteorological Agency, 'Doppler Radar for Airport Weather Manufacturing Specification (Kagoshima Airport)', May 2006, p. 19" discloses a technique of replacing IQ data judged as including interference waves with IQ data of a hit before.

BRIEF DESCRIPTION OF THE DRAWINGS

FIG. 1 is a block diagram illustrating a configuration of a weather radar system using a Doppler radar of the present embodiment;

DETAILED DESCRIPTION

Figure 2:
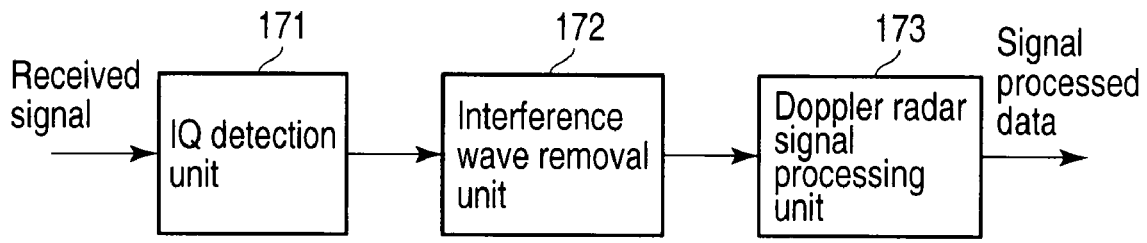
FIG. 2 is a block diagram illustrating a detailed configuration of a signal processing device.

In general, according to one embodiment, a Doppler radar apparatus includes a quadrature detection unit, an interference judgment unit, a correction unit, and a calculation unit. The quadrature detection unit is configured to quadrature-detect a received signal of a reflected pulse from an observation target, and generate time-series data including an in-phase component and a quadrature component. The interference judgment unit is configured to judge whether an interference signal is mixed into the received signal based on the time-series data of the in-phase component and the time-series data of the quadrature component. The correction unit is configured to correct a vector expressed by the in-phase component and the quadrature component such that variation with respect to time of a deviation angle of the vector continues when the interference judgment unit has judged that an interference signal is mixed into the received signal. The calculation unit is configured to calculate a Doppler velocity of the observation target based on an amount of variation with respect to time of the deviation angle of the vector corrected by the correction unit.

Hereinafter, an embodiment will be described in detail with reference to the accompanying drawings.

FIG. 1 is a block diagram illustrating a configuration of a weather radar system using a Doppler radar according to the present embodiment. According to the weather radar system, it is possible to observe the precipitation intensity and the Doppler velocity.

The system includes an antenna device 11, a transmitting device 12, a receiving device 13, a frequency conversion device 16, a signal processing device 17, a monitor control device 18, a data conversion device 19, a data display device 20, a data storage device 21, a data communication device 22, a remote monitor control device 23, and a remote display device 24.

The remote monitor control device 23 and the remote display device 24 are remotely provided from other devices provided in a radar site, and are used to remotely monitor and remotely control the system.

A monitor control signal configured to monitor or control the system is transmitted from the remote monitor control device 23 to the monitor control device 18. The monitor control device 18 transmits a control signal to the signal processing device 17 according to the monitor control signal. Further, the monitor control device 18 receives a monitor signal from the signal processing device 17 and transfers the received monitor signal to the remote monitor control device 23.

The signal processing device 17 outputs an analogue transmission intermediate frequency (IF) signal to the frequency conversion device 16, according to the digital control signal from the monitor control device 18. The frequency conversion device 16 converts (up-converts) the transmission IF signal to a transmission radio frequency (RF) signal, and outputs the converted signal to the transmitting device 12. The transmitting device 12 amplifies the transmission RF signal to a transmission wave of a transmission power that can be observed from a far distance, and outputs the amplified signal to the antenna device 11.

The transmitted wave is radiated to the air from the antenna device 11, and is reflected by an observation target. The observation target in the weather radar system is precipitation particles existing in a predetermined valid reflective area.

The reflected wave (received wave) from the observation target is captured by the antenna device 11, and is received by the receiving device 13. The receiving device 13 demodulates the received wave, and outputs a received RF signal to the frequency conversion device 16. The frequency conversion device 16 frequency-converts (down-converts) the received RF signal to a received IF signal and outputs the frequency-converted signal to the signal processing device 17.

The signal processing device 17 subjects the received IF signal output from the frequency conversion device 16 to necessary signal processing procedures, such as IQ detection, analogue-to-digital (A/D) conversion, received power calculation, interference wave removal, Doppler velocity calculation, and the like.

FIG. 2 is a block diagram illustrating a detailed configuration of the signal processing device 17. As shown in FIG. 2, the signal processing device 17 includes an IQ detection unit 171, an interference wave removal unit 172, and a Doppler radar signal processing unit 173.

The IQ detection unit 171 divides the received signal to two systems, and performs a quadrature detection (IQ detection) using reference intermediate frequency oscillation signals (COHO signal) phase-offset from one another by 90 degrees. Thereby, in-phase (I) data and quadrature (Q) data are generated. The I data and the Q data are A/D converted by an A/D conversion circuit (not shown), and output to the interference wave removal unit 172.

The interference wave removal unit 172 removes the effect of interference waves from the IQ data through an interference wave removal process, which will be described later. In the interference wave removal process, data correction is performed such that time continuity in phase variation is maintained between different pulse hits. In order for the interference wave removal process, the interference wave removal unit 172 may include a buffer that stores IQ time-series data of a predetermined number of hits.

The Doppler radar signal processing unit 173 calculates the precipitation intensity based on the mean power of the IQ data, from which the interference of the interference waves has been removed, and also calculates the Doppler velocity from the phase variation amount of IQ data.

The signal processed data (such as precipitation intensity and Doppler velocity) digitally signal processed by the signal processing device 17 is output to the data conversion device 19. The data conversion device 19 analyzes the data based on the received power and the Doppler velocity calculated by the signal processing device 17. The data display device 20 is a display device, such as an LCD, and displays data analyzed by the data conversion device 19. The data storage device 21 includes a storage device, such as a hard disc drive (HDD), and stores the data analyzed by the data conversion device 19.

The data communication device 22 transfers the analyzed data to the remote display device 24 outside the radar site via a wireless or wired network. The remote display device 24 includes a display device, such as an LCD, and displays data transferred from the data communication device 22.

It is thereby possible to analyze the radar site from a remote place based on data displayed on the remote display device 24, and monitor and control the radar site using the remote monitor control device 23.

As described above, the Doppler radar signal processing unit 173 calculates the precipitation intensity based on the mean received power of the radar, and calculates the Doppler velocity from the phase variation amount of the IQ-detected received signal. In this case, when the phase variation amount is incorrectly detected due to mixing of interference waves, for example, from other radar sites, the Doppler velocity is not accurately calculated.

Figure 3:
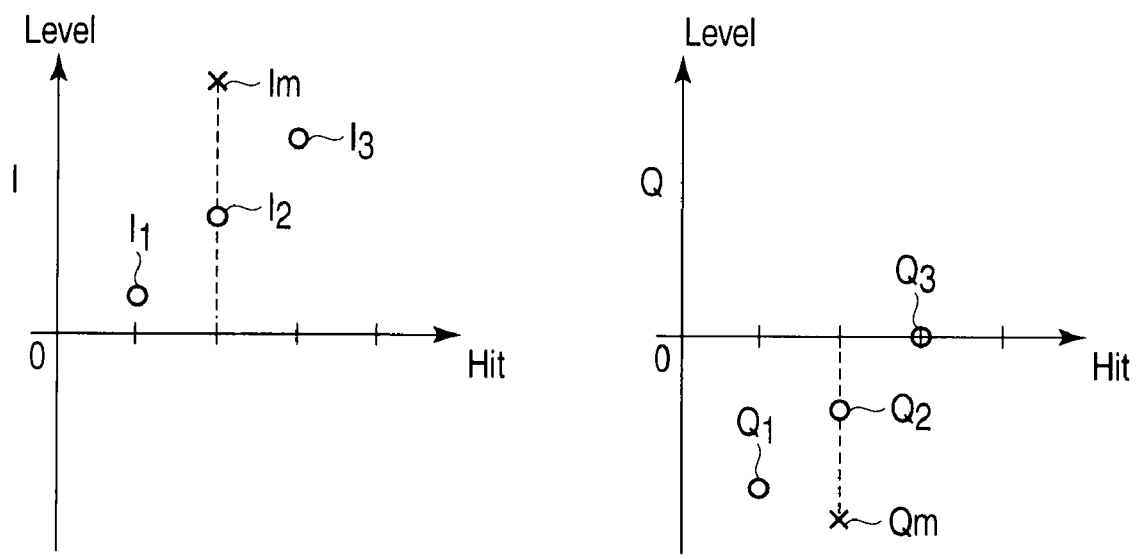
FIG. 3 illustrates an example of the effect of interference waves on I data and Q data.

FIG. 3 shows an example of an effect of an interference wave on I data and Q data. The two graphs in FIG. 3 show in-phase (I) time-series data and quadrature (Q) time-series data of three pulse hits. The lateral axis of each of the two graphs shown in FIG. 3 indicate the number of hits (time), and the lateral axis thereof indicate a signal level.

When an observation target obeys the Rayleigh probability distribution, the level of I data is expected to continuously vary with time (linearly increase with respect to time in FIG. 3), as shown by the three points $I_1$, $I_2$, $I_3$. Similarly, the levels of Q data are expected to continuously vary with time (linearly increase with respect to time in FIG. 3), as shown by the three points $Q_1$, $Q_2$, $Q_3$, corresponding to $I_1$, $I_2$, $I_3$, respectively.

When a received signal receives an effect of an interference wave, however, the levels of the I data and the Q data may fluctuate. In the example shown in FIG. 3, the effect of interference waves is caused in the received data $I_2$ and $Q_2$ in the second hit. Accordingly, the received data of the second hit greatly deviates from the continuous variation, and is observed as Im and Qm, instead of $I_2$ and $Q_2$.

Thus, when the IQ data loses its continuity due to the effect of interference waves, the phase variation amount detected by the Doppler radar signal processing unit 173 fluctuates, and the Doppler velocity is not accurately calculated. Accordingly, discontinuous data points need to be corrected. In the present embodiment, discontinuous data points generated by interference waves are corrected by the interference wave removal unit 172, and thereby continuity in phase variation is maintained.

Hereinafter, an interference judgment process and a discontinuous data point correction process according to the present embodiment will be described.

Figure 4:
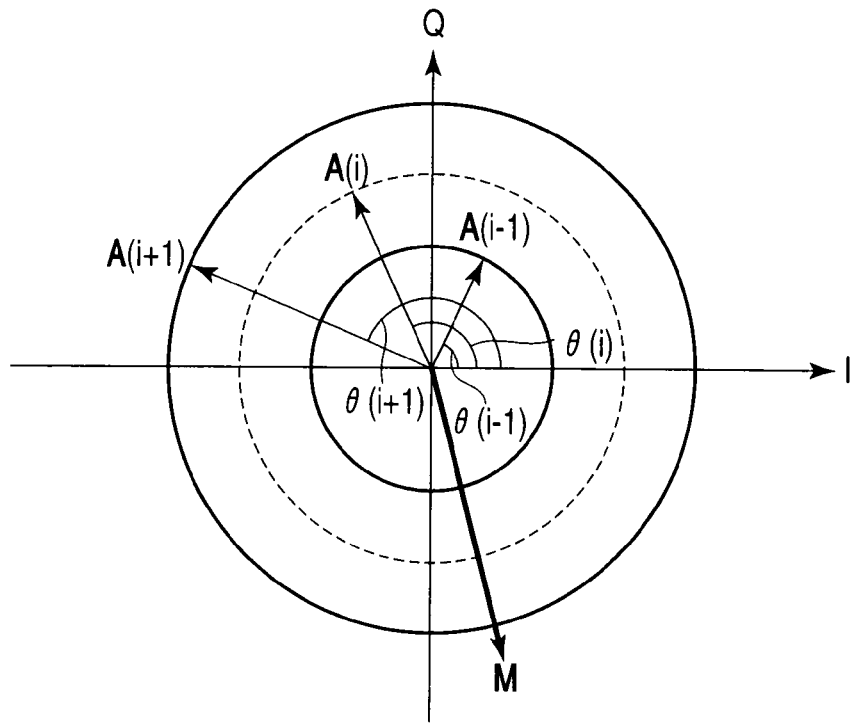
FIG. 4 illustrates an example of received signals expressed as vectors on an IQ plane.

FIG. 4 shows an example of a received signal represented as vectors on an IQ plane.

As shown in FIG. 4, I data I (i) and Q data Q (i) detected from a received signal in an ith hit (where i is an arbitrary integer) are expressed by Formula (1) and can be illustrated as a received signal vector A (i) on the IQ plane.

$$A(i)=(I(i),Q(i)) \qquad (1)$$

It is to be noted that the length (absolute value) |A(i)| of the received signal vector A (i) is Formula (2), and the phase (deviation angle) θ(i) is represented by Formula (3).

$$|A(i)|=\sqrt{I(i)^2+Q(i)^2} \qquad (2)$$

$$\theta(i) = \arctan\left(\frac{Q(i)}{I(i)}\right) \qquad (3)$$

FIG. 4 shows the following three vectors as examples:

$$A(i-1)=(I(i-1),Q(i-1)),$$

$$A(i)=(I(i),Q(i))$$

$$A(i+1)=(I(i+1),Q(i+1)) \qquad (4)$$

If the received signal is not affected by interference waves, the received signal vectors A (i−1), A (i), and A(i+1) maintain the continuity, as shown in FIG. 4. That is, the absolute value of the received signal vector A (i) becomes an approximately intermediate value of the absolute value of the received signal vector A (i−1) of a hit before, and the absolute value of the received signal vector A (i+1) of a hit after. Further, the deviation angle of the received signal vector A (i) becomes an angle near the center of the deviation angle of the received signal vector A (i−1) of a hit before, and the deviation angle of the received signal vector A (i+1) of a hit after.

When interference waves are mixed into the received signal of the ith hit, for example, however, the vector M=(I', Q') having a deviation angle greatly different from the vector A (i) is detected as a received signal vector A (i).

Even when the Doppler velocity is calculated based on the detected received signal vectors A (i−1), M, and A (i+1), continuity in phase is not maintained for the vector M, and the calculated Doppler velocity does not become an accurate value.

Further, even by replacing the received signal vector A (i) in which the interference waves are mixed with the received signal vector A (i−1) of a hit before, as in a conventional technique, the continuity in phase is not maintained. Accordingly, the accurate Doppler rate is not calculated.

Figure 5:
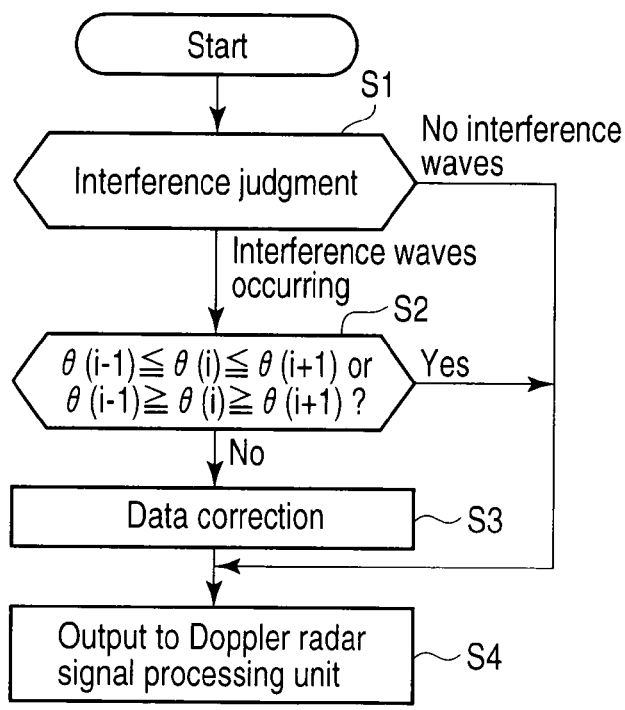
FIG. 5 is a flowchart illustrating an interference wave removal process of the present embodiment.

The interference wave removal unit 172 of the present embodiment performs the interference wave removal process shown in FIG. 5, and removes the effect caused by the interference waves.

FIG. 5 is a flowchart illustrating an interference wave removal process according to the present embodiment.

The interference wave removal unit 172 judges whether interference is occurring based on IQ data transmitted from the IQ detection unit 171 (step S1). Whether interference is occurring or not is judged by an interference judging formula, such as the following Formula (5), $$|A(i)-A(i-1)|<C1 \text{ and } |A(i+1)-A(i)|>C2 \qquad (5),$$

where C1 and C2 are predetermined positive integer values. That is, when the absolute value of the difference vector between the received signal vectors A (i) and A (i−1) is smaller than a predetermined value C1 and the absolute value of the difference vector of the received signal vectors A (i+1) and A (i) is greater than a predetermined value C2, the received signal of the ith hit is judged as being affected by the interference waves.

When the interference wave removal unit 172 has judged that interference is not occurring ("No interference waves" in step S1), that is, when the interference judging formula (5) does not hold, the IQ data is output to the Doppler radar signal processing unit 173, as it is (step S4).

When interference has been judged as being occurring ("Interference waves occurring" in step S1), that is, when the interference judgment formula (5) holds, it is judged whether the deviation angle θ (i) of the received signal vector A (i) is within a predetermined angle range (step S2). The angle range of the deviation θ (i) is defined by Formula (6), for example.

$$\theta(i-1) \leq \theta(i) \leq \theta(i+1) \text{ or } \theta(i-1) \geq \theta(i) \geq \theta(i+1) \qquad (6)$$

According to Formula (6), the interference wave removal unit 172 judges whether θ (i) is within the angle range between the deviation θ (i−1) of the received signal vector A (i−1) of a hit before, and a deviation angle θ (i+1) of the received signal vector A (i+1) of a hit after.

When the interference wave removal unit 172 has judged that the deviation angle θ (i) is within a predetermined angle range (Yes in Step S2), that is, when Formula (6) holds, continuity in phase is regarded as being maintained, and the IQ data is output to the Doppler radar signal processing unit 173, as it is (step S4).

When the interference wave removal unit 12 has judged that the deviation angle θ (i) is out of the predetermined angle range (No in step S2), that is, when Formula (6) does not hold, continuity in phase is not maintained, and correction of the received data is performed (step S3).

The data correction in step S3 is performed such that the deviation angle θ (i) of the received signal vector A (i) maintains continuity between the deviation angles of the prior and subsequent received signal vectors.

The absolute value |A (i)| of A (i) can be corrected by Formula (7), and the deviation angle θ(i) can be corrected by Formula (8).

$$|A(i)| = \frac{|A(i+1)| + |A(i-1)|}{2} \qquad (7)$$

$$\theta(i) = \begin{cases} \theta(i-1) + \dfrac{\theta(i+1) - \theta(i-1)}{2} & \theta(i+1) \geq \theta(i-1) \\ \theta(i+1) + \dfrac{\theta(i-1) - \theta(i+1)}{2} & \theta(i+1) < \theta(i-1) \end{cases} \qquad (8)$$

According to the correction using Formulas (7) and (8), the absolute value |A (i)| of the received signal vector A (i) becomes an arithmetic mean of the absolute value |A (i)| of the vector A (i−1) and the absolute value |A (i+1)| of the vector |A (i+1)|. Further, the deviation angle θ (i) of the received signal vector A (i) becomes the center of the deviation angle θ(i−1) of the vector A (i−1) and the deviation angle θ(i+1) of the vector A (i+1).

Accordingly, the corrected received signal vector A (i) maintains continuity between the previous and next vectors A (i−1) and A (i+1).

Using the corrected received signal vector, Formula (9) provides the corrected I data and Q data.

$$\begin{cases} I(i) = A(i)\cos\theta(i) \\ Q(i) = A(i)\sin\theta(i) \end{cases} \qquad (9)$$

Further, as another example of data correction, the value of I data may be corrected by Formula (10), and the value of Q data may be corrected by Formula (11), instead of the absolute value |A (i)| of the received signal vector A (i) and the deviation angle θ (i).

$$I(i) = \frac{I(i+1) + I(i-1)}{2} \qquad (10)$$

$$Q(i) = \frac{Q(i+1) + Q(i-1)}{2} \qquad (11)$$

The corrected received data (IQ data) is output to the Doppler radar signal processing unit 173 (step S4).

As described above, according to the present embodiment, even if a received signal is affected by interference waves, the received data can be corrected such that continuity in phase time variation is maintained. This makes it possible for the Doppler radar signal processing unit 173 to calculate the Doppler velocity more accurately.

The interference wave removal unit 172 performs the above-described interference wave removal process per pulse hit, and outputs IQ data for maintaining phase continuity to the Doppler radar signal processing unit 173.

In the present embodiment, the absolute value |A (i)| of the received signal vector A (i) has been described as being the arithmetic mean of the absolute value |A (i−1)| of the vector (i−1) and the absolute value |A (i+1)| of the vector A (i+1). However, the method of correcting the absolute value of the received signal vector is not limited thereto, and other mean values, such as the geometric value, may be used.

In the present embodiment, even when an interference wave has been judged as being occurring in step S1, when the received signal vector deviation angle θ(i) is within a predetermined angle range, phase continuity is regarded as being maintained to a sufficient degree, and data correction is not performed. However, when judgment of step S2 is not performed and it is judged as "Interference occurred" in step S1, the data correction may always be performed.

Further, in the present embodiment, it has been judged in step S2 whether the deviation angle θ(i) is within the angle range between the deviation angle θ(i−1) of a hit before and the deviation angle θ(i+1) of a hit after. However, the angle range may be broadened or decreased according to the precision of the radar.

In the present embodiment, the interference wave removal process is performed using the data of the received signal of a hit before and a hit after. However, interference removal may be performed using data of a plurality of hits before and a plurality of hits after.

In the present embodiment, the interference wave removal in the weather radar for observing the amount of precipitation, for example, has been described as an example. However, the above-described embodiment may be applied to other primary radars, such as Airport Surveillance Radars for detecting airplanes. In particular, in aircraft detection radars, the amplitude of the observed received waves does not vary, and only the phase varies. According to the Doppler radar of the present embodiment, even when only the phase varies, the effect of interference waves can be removed more accurately.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A Doppler radar apparatus, comprising:
   a quadrature detection unit configured to quadrature-detect a received signal of a reflected pulse from an observation target, and generate time-series data including an in-phase component and a quadrature component;
   an interference judgment unit configured to judge whether an interference signal is mixed into the received signal based on the time-series data of the in-phase component and the time-series data of the quadrature component;
   a correction unit configured to correct a vector expressed by the in-phase component and the quadrature component based on deviation angles of prior and subsequent received signal vectors such that variation with respect to time of the deviation angle of the vector maintains continuity when the interference judgment unit has judged that an interference signal is mixed into the received signal; and
   a calculation unit configured to calculate a Doppler velocity of the observation target based on an amount of variation with respect to time of the deviation angle of the vector corrected by the correction unit.

2. The apparatus according to claim 1, wherein the correction unit corrects the vector such that the deviation angle of the vector is within a predetermined angle range.

3. The apparatus according to claim 1, wherein
   the in-phase component and the quadrature component generated in time series by the quadrature detection unit forms each component of the vector in time series, and
   the correction unit corrects the vector such that the deviation angle of the vector becomes an angle between deviation angles of vectors of hits before and after the received signal.

4. The apparatus according to claim 1, wherein
   the correction unit corrects the vector such that an absolute value of the vector becomes a mean value of absolute values of vectors of hits before and after the received signal.

5. The apparatus according to claim 1, wherein
   the correction unit corrects the vector such that a mean value of the in-phase components and the quadrature components of hits before and after the received signal becomes a component of the vector.

6. A method of calculating a Doppler velocity used in a Doppler radar apparatus, the method being implemented in a signal processor, the method comprising:
   quadrature-detecting a received signal of a reflected pulse from an observation target and generating time-series data including an in-phase component and a quadrature component;
   judging whether an interference signal is mixed into the received signal based on the time-series data of the in-phase component and the time-series data of the quadrature component;
   correcting a vector expressed by the in-phase component and the quadrature component based on deviation angles of prior and subsequent received signal vectors such that variation with respect to time of the deviation angle of the vector maintains continuity when it is judged that an interference signal is mixed into the received signal; and
   calculating the Doppler velocity of the observation target based on an amount of variation with respect to time of the deviation angles of corrected vectors.

7. The method according to claim 6, wherein the vector is corrected such that the deviation angle of the vector is within a predetermined angle range.

8. The method according to claim 6, wherein
   the in-phase component and the quadrature component generated in time series form each component of the vector in time series, and
   the vector is corrected such that the deviation angle of the vector becomes an angle between deviation angles of vectors of hits before and after the received signal.

9. The method according to claim 6, wherein
   the vector is corrected such that an absolute value of the vector becomes a mean value of absolute values of vectors of hits before and after the received signal.

10. The method according to claim 6, wherein
    the vector is corrected such that a mean value of the in-phase components and the quadrature components of hits before and after the received signal becomes a component of the vector.

* * * * *